United States Patent
Tang

(10) Patent No.: US 11,228,895 B2
(45) Date of Patent: Jan. 18, 2022

(54) METHOD FOR DETERMINING MOVEMENT STATE OF UE, UE AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/937,275

(22) Filed: Jul. 23, 2020

(65) Prior Publication Data

US 2020/0359193 A1 Nov. 12, 2020

Related U.S. Application Data

(63) Continuation of application No. PCT/CN2018/074183, filed on Jan. 25, 2018.

(51) Int. Cl.
| | |
|---|---|
| *H04W 4/00* | (2018.01) |
| *H04W 8/08* | (2009.01) |
| *H04W 76/27* | (2018.01) |
| *H04W 36/08* | (2009.01) |
| *H04W 36/32* | (2009.01) |

(52) U.S. Cl.
CPC ............. *H04W 8/08* (2013.01); *H04W 36/08* (2013.01); *H04W 36/32* (2013.01); *H04W 76/27* (2018.02)

(58) Field of Classification Search
CPC ....... H04W 8/08; H04W 76/27; H04W 36/08; H04W 36/32; H04W 36/00837; H04W 36/0011

USPC .......................................................... 370/329
See application file for complete search history.

(56) References Cited

U.S. PATENT DOCUMENTS

| | | | | |
|---|---|---|---|---|
| 7,830,842 | B2 * | 11/2010 | Strutt | H04W 64/00 370/338 |
| 9,049,698 | B2 * | 6/2015 | Johansson | H04W 40/36 |
| 9,078,150 | B2 * | 7/2015 | Jung | H04W 36/0085 |
| 9,344,937 | B2 * | 5/2016 | Jung | H04W 36/245 |
| 2010/0093350 | A1 | 4/2010 | Wang | |
| 2013/0053065 | A1 | 2/2013 | Xiao et al. | |
| 2014/0044029 | A1 | 2/2014 | Chou et al. | |

(Continued)

FOREIGN PATENT DOCUMENTS

| | | |
|---|---|---|
| CN | 102238581 A | 11/2011 |
| CN | 103501517 A | 1/2014 |

(Continued)

OTHER PUBLICATIONS

3GPP TS 36.304 V14.4.0 (Sep. 2017), "User Equipment (UE) procedures in idle mode", Evolved Universal Terrestrial Radio Access (E-UTRA), (Release 14).

(Continued)

*Primary Examiner* — Amancio Gonzalez
(74) *Attorney, Agent, or Firm* — Ladas & Parry, LLP

(57) ABSTRACT

Disclosed are a method for determining the mobility state of user equipment (UE), UE and a computer storage medium. The method comprises: when a UE enters a connected state for a short time, keeping maintaining a movement state evaluation variable, and determining a movement state thereof based on the movement state evaluation variable.

17 Claims, 4 Drawing Sheets

---

When UE is in an inactive state or idle state, keeping maintaining a mobility state evaluation variable and determining a mobility state of the UE based on the mobility state evaluation variable — 101

When the UE enters the connected state for short, keeping maintaining the mobility state evaluation variable and determining the mobility state of the UE based on the mobility state evaluation variable — 102

(56) References Cited

U.S. PATENT DOCUMENTS

| | | |
|---|---|---|
| 2015/0208303 A1 | 7/2015 | Jung et al. |
| 2015/0257054 A1 | 9/2015 | Wang et al. |
| 2016/0198384 A1 | 7/2016 | Jung et al. |
| 2016/0295441 A1 | 10/2016 | Yang et al. |
| 2017/0156091 A1 | 6/2017 | Wang et al. |

FOREIGN PATENT DOCUMENTS

| | | |
|---|---|---|
| CN | 104137612 A | 11/2014 |
| CN | 104521257 A | 4/2015 |
| WO | 2013115576 A1 | 8/2013 |

OTHER PUBLICATIONS

Written Opinion of the International Search Authority in the international application No. PCT/CN2018/074183, dated Oct. 12, 2018.

International Search Report in the International application No. PCT/CN2018/074183, dated Oct. 12, 2018.

Alcatel-Lucent Report of email discussion [84#31][LTE/Het-Net] Mobility information upon Idle->Connected R2-140703 3GPP TSG-RAN WG2#85, Feb. 10-14, 2014, pp. 1-33.

Written Opinion of the International Searching Authority In international application No. PCT/CN2018/074183, dated Oct. 12, 2018 with English translation provided by Google Translate.

Supplementary European Search Report in the European application No. 18903011.7, dated Mar. 18, 2021.

Samsung: "Mobility states and speed dependant scaling of measurement related parameters in NR Idle/Inactive mode", 3GPP Draft; R2-1705828 Mobility States and Speed Dependant Scaling of Measurement Related Parameters in NR Idle Inactive Mode R3, 3rd Generation Partnership Project (3GPP), Mobile Competence Centre; vol. RAN WG2, No. Hangzhou, China; May 15-19, 2017, May 14, 2017 (May 14, 2017),XP051283959.

OPPO: "Mobility state estimation issue during RRC state transition", 3GPP Draft; R2-1806957-Mobility State Estimation Issue During RRC State Transition, 3rd Generation Partnership Project (3GPP), Mobile Competence Centre; 650, Route Des Lucioles; F-06921 Sophia-Antip, vol. RAN WG2, No. Busan, Korea; May 21-25, 2018, May 20, 2018 (May 20, 2018), XP051443391.

\* cited by examiner

METHOD FOR DETERMINING MOVEMENT STATE OF UE, UE AND COMPUTER STORAGE MEDIUM

CROSS-REFERENCE TO RELATED APPLICATION

The present application is a continuation of International Application No. PCT/CN2018/074183 filed on Jan. 25, 2018, the disclosure of which is hereby incorporated by reference in its entirety.

TECHNICAL FIELD

The disclosure relates to the technical field of information processing, and particularly to a method for determining a mobility state of User Equipment (UE), UE and a computer storage medium.

BACKGROUND

When UE executes cell selection and reselection in an idle state, for ensuring mobility robustness, the UE is required to regulate a cell reselection parameter according to the speed of the UE. At present, a mobility state determination rule in Long Term Evolution (LTE) is as follows: in a mobility state, the mobility state of UE is defined by the number of cell reselection times in a specified time, for example, as shown in FIG. 1, high-mobility, medium-mobility and normal-mobility states, etc. are included, and such mobility may be determined, as shown in the figure, based on threshold values corresponding to different numbers of handover times, including two threshold values N CR-H (i.e., a high threshold value) and N CR_M (i.e., a low threshold value or a normal threshold value). The mobility state of the UE may be indicated by a mobility state evaluation variable. Speed-based scaling is performed on a cell reselection parameter based on a present mobility state of the UE to reduce influence of a mobile speed on mobility of the UE.

Under a normal condition, after UE enters a connected state, a mobility state of the UE is statistically obtained according to the number of cell handover times. Such statistics is made by an Evolved Node B (eNB) because mobility in the connected state is controlled by a network side. How to process the mobility state evaluation variable under the condition that the UE enters the connected state for short is required to be redefined.

SUMMARY

For solving the technical problem, embodiments of the disclosure provide a method for determining a mobility state of UE, UE and a computer storage medium.

The embodiments of the disclosure provide a method for determining a mobility state of UE, which may be applied to the UE and include the following operation.

When the UE enters a connected state for short, a mobility state evaluation variable is kept maintained, and a mobility state of the UE is determined based on the mobility state evaluation variable.

The embodiments of the disclosure provide UE, which may include: a network interface; a processor; and a memory configured to store a computer program capable of running in the processor, the processor is configured to run the computer program to, when a connected state is entered for short, keep maintaining a mobility state evaluation variable and determine a mobility state of the UE based on the mobility state evaluation variable.

The embodiments of the disclosure provide a computer storage medium having computer-executable instructions stored thereon, the computer-executable instructions is executed to: when the UE enters a connected state for short, keeping maintaining a mobility state evaluation variable, and determining a mobility state of the UE based on the mobility state evaluation variable.

DETAILED DESCRIPTION

For making the characteristics and technical contents of the embodiments of the disclosure understood in more detail, implementation of the embodiments of the disclosure will be described below in combination with the drawings in detail. The drawings are only adopted for explanation as references and not intended to limit the embodiments of the disclosure.

First Embodiment

The embodiment of the disclosure provides a method for determining a mobility state of UE, which is applied to the UE and includes the following operations: when the UE enters a connected state for short, a mobility state evaluation variable is kept maintained, and a mobility state of the UE is determined based on the mobility state evaluation variable.

Figure 1:
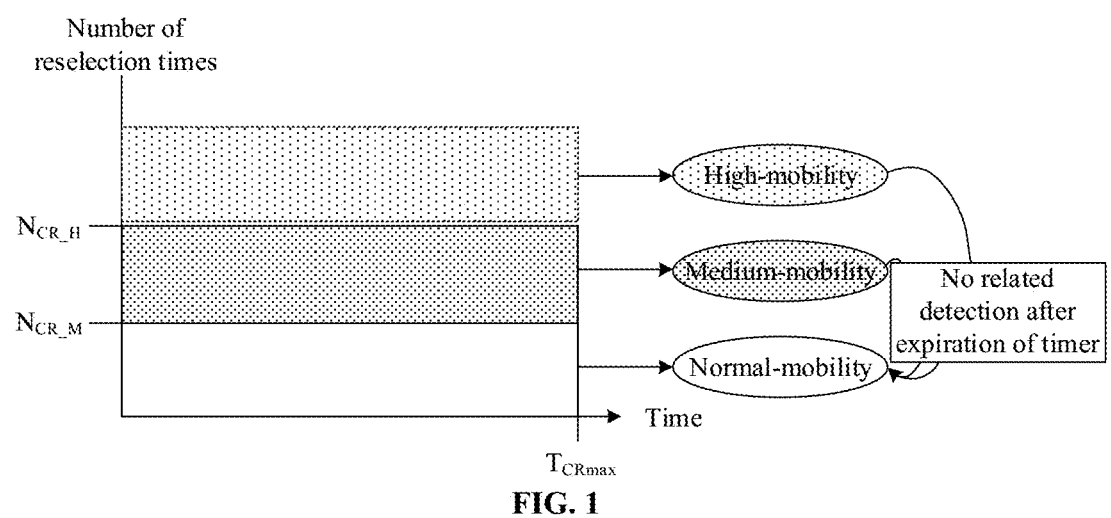
FIG. 1 is a schematic diagram of division of mobility states.
Figure 2:
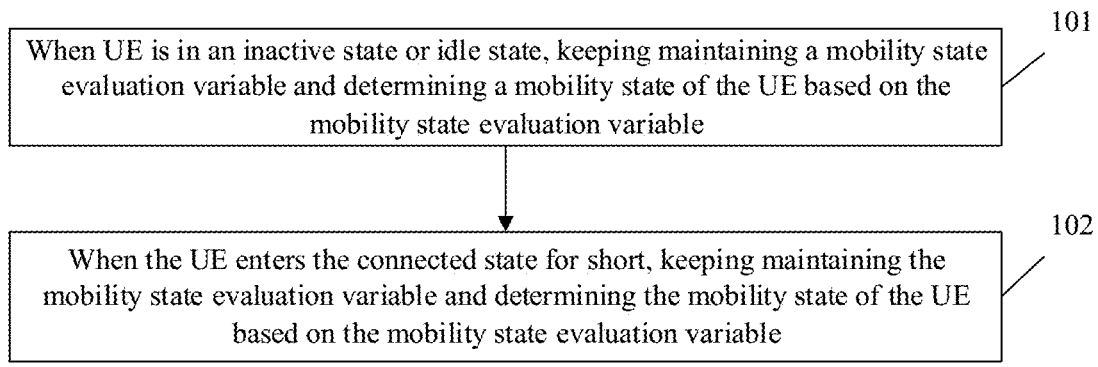
FIG. 2 is a flowchart of a method for determining a mobility state of UE according to an embodiment of the disclosure.

In addition, there may also corresponding rules for other states. For example, referring to FIG. 2, the following steps are further included.

In 101, when the UE is in an inactive state or an idle state, the mobility state evaluation variable is kept maintained, and the mobility state of the UE is determined based on the mobility state evaluation variable. That is, the present UE executes a cell reselection principle in the inactive state, so the mobility state of the UE is also required to be evaluated. Such processing may be similar to processing for the idle state. Therefore, the UE keeps maintaining the mobility state evaluation variable and does not reset it in the idle state and the inactive state.

In 102, when the UE enters a connected state for short, the mobility state evaluation variable is kept maintained, and the mobility state of the UE is determined based on the mobility state evaluation variable.

It is to be understood that the two steps are not intended to limit a processing sequence but only to indicate two processing characteristics in the application. That is, the two steps may be executed in the abovementioned sequence, or 102 is executed after it is determined that the UE enters the connected state for short and 101 is executed when it is determined that the UE enters the idle or inactive state. Elaborations are omitted herein.

For the condition that the UE enters the connected state for short, there may be the following conditions.

First

When the UE enters the connected state while executing periodic position updating processing, it is determined that the UE enters the connected state for short.

That is, when the UE temporarily enters the connected state while performing periodic position updating, the mobility state evaluation variable is not reset.

Second

After the UE enters the connected state, if the UE only transmits a small service data packet and a duration of keeping the connected state is shorter than a time threshold value, it is determined that the UE enters the connected state for short.

That is, when the UE enters the connected state to only transmit the small service data packet and returns to the idle or inactive state soon, the mobility state evaluation variable is not reset.

In addition, the following determination may be made in parallel with the above two conditions or simultaneously with the above two conditions.

The time threshold value is acquired through a system broadcast.

When the UE enters the connected state and the duration of keeping the connected state is shorter than the time threshold value, it is determined that the UE enters the connected state for short, the mobility state evaluation variable is not reset, the mobility state of the UE is determined based on the mobility state evaluation variable, and the number of handover times in the connected state is counted in the number of reselection times.

When the duration in which the UE is kept in the connected state is longer than the time threshold value, the mobility state evaluation variable is reset.

That is, the time threshold value t is acquired at first (it is also to be understood that the time threshold value may be configured by the system broadcast and may also be pre-stored by a UE side, which is not limited), and when the duration in which the UE is kept in the connected state is shorter than t, the mobility state evaluation variable is not reset, and in such case, the number of handover times in the connected state may also be counted in the number of reselection times.

When the duration in which the UE is kept in the connected state is longer than t, the mobility state evaluation variable is reset. That is, when the UE enters the connected state and is kept in the connected state not for short, a network side may evaluate the mobility state. Under this condition, when the UE, after the mobility state evaluation variable is reset, returns to the idle state or the inactive state from the connected state, a present mobility state of the UE is acquired according to Radio Resource Control (RRC) signaling sent by the network side.

It is finally to be pointed out that the duration of keeping the connected state may be evaluated by defining a sliding window. For example, during the process of evaluating the mobility state, the sliding window is defined, herein ending time of the sliding window is updated to present time and a length of the sliding window is a preset length configured by the system broadcast, and the mobility state evaluation variable is determined based on the number of cell reselection times between starting time and ending time of the sliding window, herein the starting time is obtained by subtracting the length of the sliding window from the ending time.

That is, during the process of evaluating the mobility state, the sliding window is defined, the sliding window is kept updated to the present time along with the time, the length of the sliding window is TCRmax, the ending time is the present time n and the starting time is time n-TCRmax, and the mobility state is evaluated based on the number of cell reselection times therebetween.

It can be seen that, based on the solution, the UE, when entering the connected state for short, may keep maintaining the mobility state evaluation variable and determine the mobility state of the UE according to the mobility state evaluation variable, so that the condition that a network side and a UE side are frequently switched for mobility determination is avoided, the UE may correctly determine the mobility state of the UE only by configuring a principle for determining and storing the mobility state of the UE by the UE, and mobility robustness of the UE is further improved.

Second Embodiment

Figure 3:
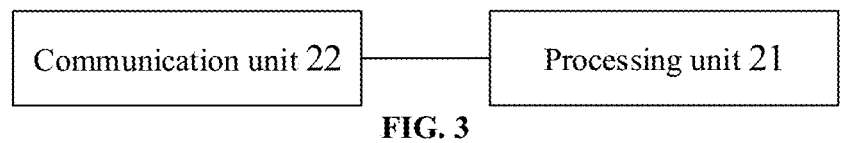
FIG. 3 is a structure diagram of UE according to an embodiment of the disclosure.

The embodiment of the disclosure provides UE, which, as shown in FIG. 3, includes a processing unit 21.

The processing unit 21 is configured to, when a connected state is entered for short, keep maintaining a mobility state evaluation variable and determine a mobility state of the UE based on the mobility state evaluation variable.

In addition, there may also be corresponding rules for other states. For example, the processing unit 21 is configured to, when the UE is in an inactive state or an idle state, keep maintaining the mobility state evaluation variable and determine the mobility state of the UE based on the mobility state evaluation variable. That is, the present UE executes a cell reselection principle in the inactive state, so the mobility state of the UE is also required to be evaluated. Such processing may be similar to processing for the idle state. Therefore, the UE keeps maintaining the mobility state evaluation variable and does not reset it in the idle state and the inactive state.

For the condition that the UE enters the connected state for short, there may be the following conditions.

First

The processing unit 21 is configured to, when the UE enters the connected state while executing periodic position updating processing, determine that the UE enters the connected state for short.

That is, when the UE temporarily enters the connected state while performing periodic position updating, the mobility state evaluation variable is not reset.

A Second Manner

The processing unit 21 is configured to, after the UE enters the connected state, if the UE only transmits a small service data packet and the duration of keeping the connected state is shorter than a time threshold value, determine that the UE enters the connected state for short.

That is, when the UE enters the connected state to only transmit the small service data packet and returns to the idle or inactive state soon, the mobility state evaluation variable is not reset.

In addition, the following determination may be made in parallel with the two conditions or simultaneously with the two conditions.

The UE further includes a communication unit 22.

The communication unit 22 is configured to acquire the time threshold value through a system broadcast.

The processing unit 21 is further configured to, when the UE enters the connected state and the duration of keeping the connected state is shorter than the time threshold value, determine that the UE enters the connected state for short, do not reset the mobility state evaluation variable, determine the mobility state of the UE based on the mobility state evaluation variable and count the number of handover times in the connected state in the number of reselection times.

When the duration in which the UE is kept in the connected state is longer than the time threshold value, the mobility state evaluation variable is reset.

That is, the time threshold value t is acquired through the system broadcast at first (it is also to be understood that the time threshold value may be configured by the system broadcast or may also be pre-stored by a UE side, which is not limited), and when the duration in which the UE is kept in the connected state is shorter than t, the mobility state evaluation variable is not reset, and in such case, the number of handover times in the connected state may also be counted in the number of reselection times.

When the duration in which the UE is kept in the connected state is longer than t, the mobility state evaluation variable is reset. That is, when the UE enters the connected state and is kept in the connected state not for short, a network side may evaluate the mobility state. Under this condition, when the UE, after the mobility state evaluation variable is reset, returns to the idle state or the inactive state from the connected state, a present mobility state of the UE is acquired through Radio Resource Control (RRC) signaling sent by the network side.

It is finally to be pointed out that the duration of keeping the connected state may be evaluated by defining a sliding window. For example, the processing unit 21 is configured to: during the process of evaluating the mobility state, define the sliding window, herein ending time of the sliding window is updated to present time and a length of the sliding window is a preset length configured by the system broadcast; and determine the mobility state evaluation variable based on the number of cell reselection times between starting time and ending time of the sliding window, herein the starting time is obtained by subtracting the length of the sliding window from the ending time.

That is, during the process of evaluating the mobility state, the sliding window is defined, the sliding window is kept updated to the present time along with the time, the length of the sliding window is TCRmax, the ending time is present time n and the starting time is the time n-TCRmax, and the mobility state is evaluated based on the number of cell reselection times therebetween.

It can be seen that, based on the solution, the UE, when entering the connected state for short, may keep maintaining the mobility state evaluation variable and determine the mobility state of the UE according to the mobility state evaluation variable, so that the condition that a network side and a UE side are frequently switched for mobility determination is avoided, the UE may correctly determine the mobility state of the UE only by configuring a principle for determining and storing the mobility state of the UE by the UE, and mobility robustness of the UE is further improved.

Figure 4:
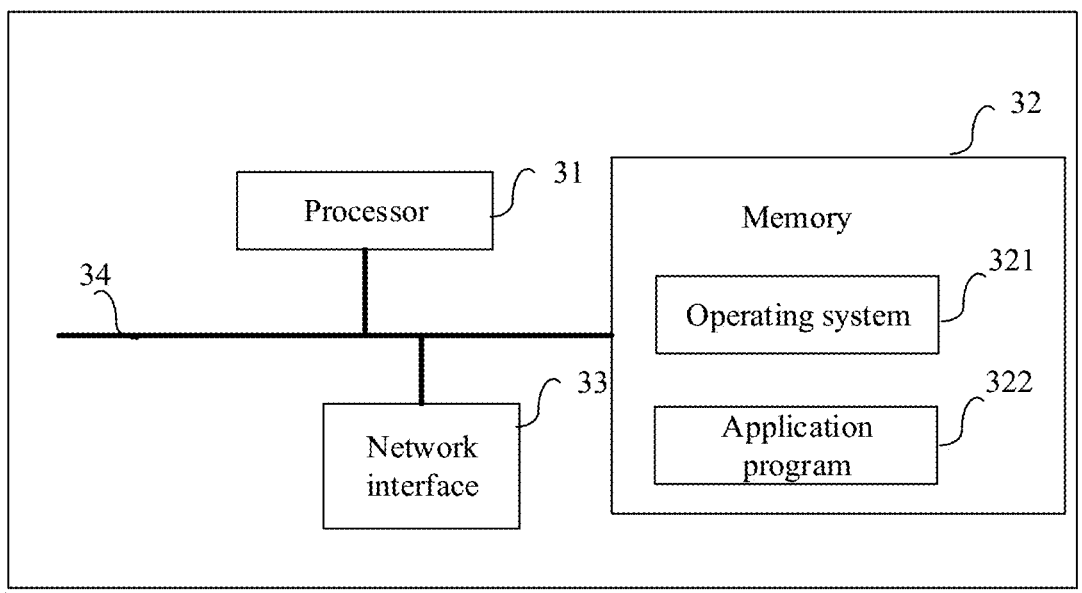
FIG. 4 is a schematic diagram of a hardware architecture according to an embodiment of the disclosure.

An embodiment of the disclosure also provides a hardware composition architecture of UE or a receiver device, which, as shown in FIG. 4, includes at least one processor 31, a memory 32 and at least one network interface 33. Each component is coupled together through a bus system 34. It can be understood that the bus system 34 is configured to implement connection communication between these components. The bus system 34 includes a data bus and further includes a power bus, a control bus and a state signal bus. However, for clear description, various buses in FIG. 3 are marked as the bus system 34.

It may be understood that the memory 32 in the embodiment of the disclosure may be a volatile memory or a nonvolatile memory, or may include both the volatile and nonvolatile memories.

In some implementation modes, the memory 32 stores the following elements, executable modules or data structures, or a subset thereof or an extended set thereof:
an operating system 321 and an application program 322.

Herein, the processor 31 is configured to be capable of processing the steps of the method in embodiment 1, which will not be elaborated herein.

An embodiment of the disclosure provides a computer storage medium, which stores computer-executable instructions, the computer-executable instruction being executed to implement the steps of the method of the first embodiment.

When being implemented in form of software functional module and sold or used as an independent product, the device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which computer programs is stored, the computer program being configured to execute the data scheduling method of the embodiments of the disclosure.

Although the preferred embodiments of the disclosure have been disclosed for the exemplary purposes, those skilled in the art may realize that it is also possible to make various improvements, additions and replacements. Therefore, the scope of the disclosure should not be limited to the abovementioned embodiments.

The invention claimed is:

1. A method for determining a mobility state of User Equipment (UE), applied to the UE and comprising:
when the UE enters a connected state for short, keeping maintaining a mobility state evaluation variable, and determining a mobility state of the UE based on the mobility state evaluation variable,
wherein the method further comprising:
during a process of evaluating the mobility state, defining a sliding window, wherein ending time of the sliding window is updated to present time and a length of the sliding window is a preset length configured by a system broadcast; and
determining the mobility state evaluation variable based on a number of cell reselection times between starting time and the ending time of the sliding window, wherein the starting time is obtained by subtracting the length of the sliding window from the ending time.

2. The method of claim 1, further comprising:
when the UE is in an inactive or idle state, keeping maintaining the mobility state evaluation variable, and determining the mobility state of the UE based on the mobility state evaluation variable.

3. The method of claim 1, wherein the UE enters the connected state for short comprises:
when the UE enters the connected state while executing periodic position updating processing, determining that the UE enters the connected state for short.

4. The method of claim 1, wherein the UE enters the connected state for short comprises:
after the UE enters the connected state, if the UE only transmits a small service data packet and a duration in which the UE is kept in the connected state is shorter than a time threshold value, determining that the UE enters the connected state for short.

5. The method of claim 1, further comprising:
acquiring a time threshold value through a system broadcast.

6. The method of claim 5, wherein keeping maintaining the mobility state evaluation variable and determining the mobility state of the UE based on the mobility state evaluation variable when the UE enters the connected state for short comprises:
when the UE enters the connected state and a duration in which the UE is kept in the connected state is shorter than the time threshold value, determining that the UE enters the connected state for short, not resetting the mobility state evaluation variable, determining the mobility state of the UE based on the mobility state evaluation variable, and counting a number of handover times in the connected state in a number of reselection times.

7. The method of claim 6, further comprising:
when the duration in which the UE is kept in the connected state is longer than the time threshold value, resetting the mobility state evaluation variable.

8. The method of claim 7, further comprising:
when the UE, after the mobility state evaluation variable is reset, returns to an idle or inactive state from the connected state, acquiring a present mobility state of the UE through Radio Resource Control (RRC) signaling sent by a network side.

9. User Equipment (UE), comprising:
a network interface;
a processor; and
a memory configured to store a computer program capable of running in the processor,
wherein the processor is configured to run the computer program to, when a connected state is entered for short, keep maintaining a mobility state evaluation variable and determine an mobility state of the UE based on the mobility state evaluation variable,
wherein the processor is further configured to run the computer program to: during a process of evaluating the mobility state, define a sliding window, wherein ending time of the sliding window is updated to present time and a length of the sliding window is a preset length configured by a system broadcast and determine the mobility state evaluation variable based on a number of cell reselection times between starting time and the ending time of the sliding window, wherein the starting time is obtained by subtracting the length of the sliding window from the ending time.

10. The UE of claim 9, wherein the processor is further configured to run the computer program to, when the UE is in an inactive or idle state, keep maintaining the mobility state evaluation variable and determine the mobility state of the UE based on the mobility state evaluation variable.

11. The UE of claim 9, wherein the processor is further configured to run the computer program to, when the UE enters the connected state while executing periodic position updating processing, determine that the UE enters the connected state for short.

12. The UE of claim 9, wherein the processor is further configured to run the computer program to, after the UE enters the connected state, if the UE only transmits a small service data packet and a duration in which the UE is kept in the connected state is shorter than a time threshold value, determine that the UE enters the connected state for short.

13. The UE of claim 9, wherein the processor is further configured to run the computer program to:
acquire a time threshold value through a system broadcast.

14. The UE of claim 13, wherein the processor is further configured to run the computer program to, when the UE enters the connected state and a duration in which the UE is kept in the connected state is shorter than the time threshold value, determine that the UE enters the connected state for short, not reset the mobility state evaluation variable, determine the mobility state of the UE based on the mobility state evaluation variable and count a number of handover times in the connected state in a number of reselection times.

15. The UE of claim 14, wherein the processor is further configured to run the computer program to, when the duration in which the UE is kept in the connected state is longer than the time threshold value, reset the mobility state evaluation variable.

16. The UE of claim 15, wherein the processor is further configured to run the computer program to, when the UE, after the mobility state evaluation variable is reset, returns to an idle or inactive state from the connected state, acquire a present mobility state of the UE through Radio Resource Control (RRC) signaling sent by a network side.

17. A non-transitory computer storage medium having computer-executable instructions stored thereon, the computer-executable instructions being executed to implement the following operation:
when the UE enters a connected state for short, keeping maintaining a mobility state evaluation variable, and determining a mobility state of the UE based on the mobility state evaluation variable,
wherein the computer-executable instructions is further executed to: during a process of evaluating the mobility state, define a sliding window, wherein ending time of the sliding window is updated to present time and a length of the sliding window is a preset length configured by a system broadcast and determine the mobility state evaluation variable based on a number of cell reselection times between starting time and the ending time of the sliding window, wherein the starting time is obtained by subtracting the length of the sliding window from the ending time.

* * * * *